United States Patent [19]

Gandhi et al.

[11] 4,374,103

[45] Feb. 15, 1983

[54] METHOD OF USING A LOW COST CATALYST SYSTEM

[75] Inventors: Haren S. Gandhi, Farmington Hills; Karen M. Adams, Dearborn Heights, both of Mich.

[73] Assignee: Ford Motor Company, Dearborn, Mich.

[21] Appl. No.: 284,762

[22] Filed: Jul. 20, 1981

[51] Int. Cl.$^3$ .............................................. B01D 53/36
[52] U.S. Cl. ............................ 423/213.5; 423/213.7; 252/465; 252/466 PT; 252/477 R
[58] Field of Search ................ 252/465, 466 PT, 477; 423/239, 213.7, 213.5; 60/301

[56] References Cited

U.S. PATENT DOCUMENTS

| | | | |
|---|---|---|---|
| 3,554,929 | 1/1971 | Aarons | 423/213.5 X |
| 3,910,770 | 10/1975 | Kobylinsky et al. | 423/213.7 X |
| 3,914,377 | 10/1975 | Anderson et al. | 423/213.7 |
| 4,192,779 | 3/1980 | Ghandi et al. | 423/213.5 |

FOREIGN PATENT DOCUMENTS

| | | | |
|---|---|---|---|
| 51-63363 | 6/1976 | Japan | 423/239 A |
| 52-54670 | 5/1977 | Japan | 423/239 A |

OTHER PUBLICATIONS

"Chem. Abst." vol. 88, 1978, 189663z.

Primary Examiner—G. O. Peters
Attorney, Agent, or Firm—William E. Johnson; Olin B. Johnson

[57] ABSTRACT

There is disclosed a method of using an exhaust gas catalyst for treatment of exhaust gases developed by burning a hydrocarbon based fuel in an internal combustion engine. These exhaust gases contain varying amounts of unburned hydrocarbons, carbon monoxide and oxides of nitrogen depending upon the operating conditions of the internal combustion engine. This specification teaches the use of an improved catalyst composition in which a support medium is provided for supporting the catalyst system, the support medium having an upstream support portion and a downstream support portion over which the exhaust gases pass in succession. The upstream support portion of the support medium has deposited thereon palladium and the downstream support portion of the support medium has deposited thereon palladium and tungsten. Tungsten is present on the downstream support portion of the support medium in a quantity such that tungsten is available to substantially all of the palladium on that portion of the support medium. The catalyst system has particular utility as a three-way catalyst operating at approximately stoichiometric conditions or as a catalyst for use in conjunction with the so-called "fast burn/low friction" engines or as an oxidation catalyst.

17 Claims, 4 Drawing Figures

METHOD OF USING A LOW COST CATALYST SYSTEM

BACKGROUND OF THE INVENTION AND PRIOR ART STATEMENT

No prior art search was conducted on the subject matter of this specification in the U.S. Patent Office or in any other search facility.

We are unaware of any prior art that is relevant to the method of using a catalyst system taught in this specification other than the teachings contained in our own application, Ser. No. 248759, entitled "Palladium Catalyst Promoted By Tungsten," filed on even date herewith. Our other application is assigned to the same assignee as this application and is hereby incorporated by reference. Our other application teaches a specific catalyst system in which a palladium catalyst is promoted by tungsten. The catalyst system has highly desirable characteristics in that it is effective in the catalytic oxidation of unburned hydrocarbons and the catalytic reduction of oxides of nitrogen without significant production of ammonia when an internal combustion engine with which it is associated is operated under fuel rich (oxygen deficient) conditions.

The disclosure of the present specification teaches the use of a catalyst formulation which we also consider to be unique. This unique catalyst formulation contains, on a suitable catalyst substrate, both an upstream catalyst portion containing palladium and a downstream catalyst portion containing palladium and tungsten.

The catalyst formulation set forth in this specification is one which finds utility in several areas. The catalyst system may be used as a three-way catalyst for association with an internal combusion engine which is operated under stoichiometric or slightly fuel rich conditions. The catalyst formulation disclosed is also one which may be used as an oxidation catalyst in association with oxygen rich exhaust gases from an internal combustion engine. Such gases may be developed, for example, by operation of an internal combustion engine under oxygen rich (fuel deficient) conditions. In another case, exhaust gases, though oxygen deficient, may have oxygen added thereto to make the overall gases oxygen rich prior to movement over such an oxidation catalyst. Still another significant use that may be made of this catalyst formulation is in the area of fast burn engines or for engines calibrated from optimum fuel economy emissions standpoint. The same catalyst formulation can be operated fuel rich under high power demand acceleration mode or fuel lean under deceleration or cruise conditions, giving a wide range of flexibility for engine calibration to optimize fuel economy and emissions over a wide range of air/fuel ratios.

The catalyst formulations disclosed herein are based upon palladium and a palladium/tungsten combination. Palladium is a catalyst material which is considerably less expensive than platinum, which has been known in the past for uses in oxidation catalyst systems. Tungsten, of course, is a base metal and is much less expensive than noble metals such as platinum and rhodium.

It is a principal object of the present invention to provide a method of using a low-cost catalyst system which may be used by the catalyst designer in at least three principally different types of catalyst systems. It is a secondary object of this invention to provide a method of using a low-cost catalyst system that functions efficiently in no matter what type of system the catalyst designer has placed the catalyst system.

As is well known to a skilled artisan, an internal combustion engine normally associated with an automobile will generally operate on both sides of a stoichiometric air/fuel ratio during various modes of engine operation. However, the engine designer at the outset of the design of the engine will select an engine operating mode under which the internal combustion engine will normally operate. For example, the so-called fast burn engines currently under development are designed to operate slightly fuel deficient during normal crusing modes of the vehicle. At such time, there is more air present than is required to oxidize the fuel. Therefore, the overall operating mode of the system is oxidizing and the catalyst materials present are operating under oxidizing conditions. In other modes of engine operation, for example, during acceleration periods, internal combustion engines associated with automotive vehicles are normally operated on the rich side of stoichiometry. In this condition, there is more fuel present than air to oxidize the same. In such a case, the overall catalyst system is exposed to reducing conditions because there is not sufficient oxygen available over the catalyst system.

When used with a fast burn internal combustion engine, the catalyst system of the present invention is one which under oxidizing conditions is effective in the catalytic oxidation of unburned hydrocarbons and carbon monoxide and under reducing conditions is effective not only in the catalytic oxidation of unburned hydrocarbons and carbon monoxide, but also in the catalytic reduction of oxides of nitrogen without significant production of ammonia. The catalyst system disclosed in this specification has these excellent characteristics when associated with a fast burn internal combustion engine, even though it uses catalyst materials substantially less expensive than a material such as platinum.

The catalyst system of this invention also has excellent characteristics when used with a slow burn type of internal combustion engine and when used with such an internal combustion engine either as a three-way catalyst or as an oxidation catalyst.

SUMMARY OF THE INVENTION

This invention relates to the use of a catalyst system in which a palladium catalyst is followed by a palladium catalyst promoted by tungsten. More particularly, this invention relates to the use of such a catalyst system as an exhaust gas catalyst for treatment of exhaust gases developed by burning a hydrocarbon fuel or hydrocarbon based fuels such as fuels containing hydrocarbons and alcohol blends in an internal combustion engine.

In accordance with the teachings of this invention, an exhaust gas catalyst is provided for use in the treatment of exhaust gases developed by burning a hydrocarbon fuel or a fuel containing hydrocarbon and alcohol blends in an internal combustion engine. The exhaust gases contain various amounts of unburned hydrocarbons, carbon monoxide and oxides of nitrogen depending upon the operating conditions of the internal combustion engine.

The improved catalyst composition used in the method is formulated in the following manner. There is initially provided a support medium for supporting the catalyst system. The support medium has both an upstream support portion over which exhaust gases initially flow and downstream support portion over which exhaust gases flow after passing over the upstream support portion thereof. Palladium is deposited on the upstream support portion. Finely divided tungsten is supported on the downstream support portion of the support medium. Palladium is also deposited on the downstream support portion of the support medium. In a sequential impregnation of these materials on the downstream support portion of the support medium, it is necessary that the tungsten be deposited prior to the palladium so that the palladium is not covered up. The tungsten is present on the downstream support portion of the support medium in quantities such that tungsten is available to substantially all of the palladium on the support medium so that the palladium/tungsten combination is effective in the catalytic oxidation of unburned hydrocarbons and carbon monoxide. The palladium/tungsten combination may also be placed on the support medium as a presynthesized compound.

It is understood by those skilled in the art that other catalyst materials, materials for protecting the catalyst materials, and materials for promoting the catalyst materials may also be present on the support medium to carry out those functions already well known to the skilled artisan.

By way of instruction and not by way of limitation to the scope of our invention, some particular details of a catalsyt system falling within the scope of the method of our invention are set forth herein. The support medium for the catalyst may be a monolithic substrate in which one half of the substrate forms the upstream support portion and the other half of the substrate forms the downstream support portion. The support medium may be a pelletized substrate or even a metallic substrate, if desired.

If a monolithic substrate is selected, it may be washcoated in its entirety with from 5% to 25% by weight of the catalyst substrate of gamma alumina. Thereafter, from 0.02 to 1.0 weight percent of finely divided palladium by weight of the substrate may be placed on the upstream support portion of the substrate. On the downstream support portion of the substrate, 0.2 to 10.0 weight percent of the substrate of finely divided tungsten may be placed thereon, followed by an amount of palladium within the ranges specified for the upstream support portion of the support medium. The preferred concentration varies from 0.5 weight percent to 5.0 weight percent tungsten.

BRIEF DESCRIPTION OF THE DRAWINGS

The novel features that are considered characteristic of the method of this invention are set forth with particularity in the appended claims. The invention itself, however, both as to its organization and its method of operation, together with additional objects and advantages thereof, will best be understood from the following description of specific embodiments when read in connection with the accompanying drawings, in which:

DESCRIPTION OF THE PREFERRED EMBODIMENT

Figure 1:
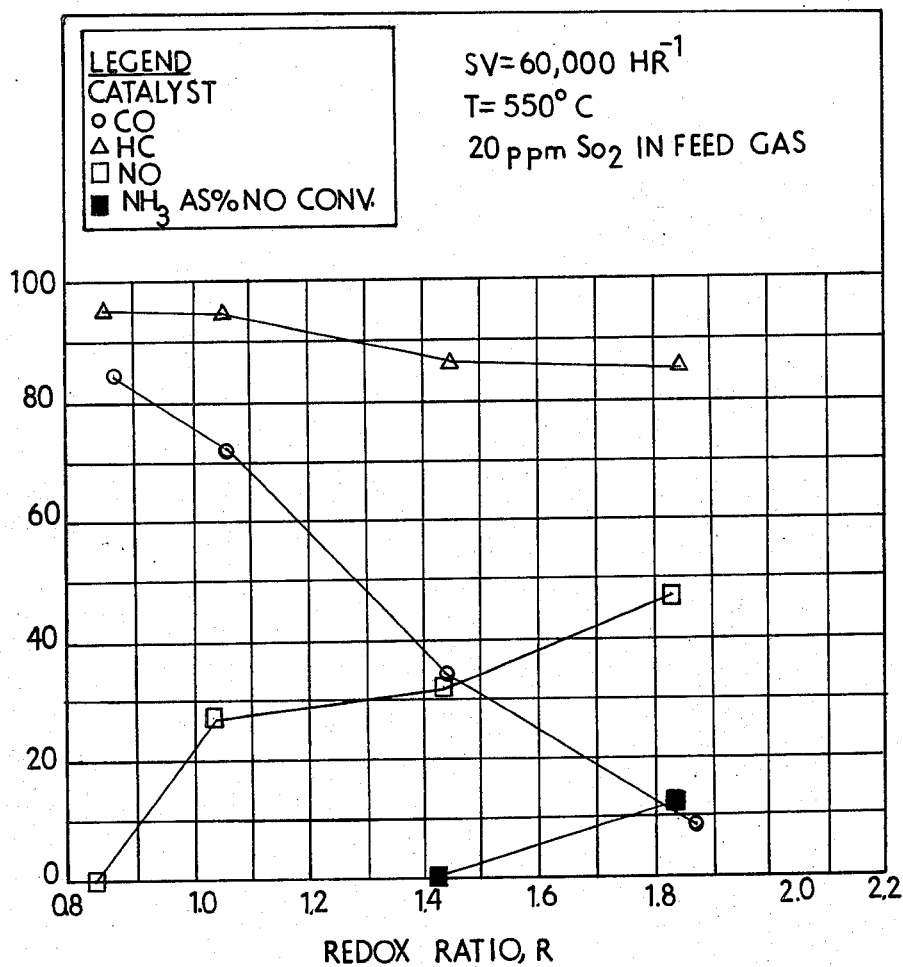
FIG. 1 is a graphical presentation of data on the effect of redox ratio on the conversion efficiency of oxides of nitrogen, carbon monoxide and hydrocarbons over a catalyst system containing 0.15% by weight palladium/4.75% by weight tungsten, and 9% by weight gamma alumina.

The following description is what we consider to be a preferred embodiment of our method of using a catalyst system. The following description also sets forth what we now contemplate to be the best mode of carrying out the fabrication of a catalyst system to be used with our method. This description is not intended to be a limitation upon the broader principles of using this catalyst system.

In order to disclose the catalyst system used with the method of this invention, we desire to demonstrate the catalytic activity of four different catalyst systems with respect to the effect of the redox ratio on the conversion efficiency of that catalyst system on oxides of nitrogen, carbon monoxide and unburned hydrocarbons. The four catalyst systems are demonstrated in FIGS. 1, 2, 3 and 4. The first system is a combined palladium/tungsten catalyst, the second is a two-zone catalyst system in which the first zone is palladium based and the second zone is palladium/tungsten, the third is a reversal of the second sytem, and the fourth is a palladium/molybdenum catalyst in a first zone of the catalyst and palladium/tungsten in the second zone of our system, the catalyst systems whose data is reported in FIGS. 2 and 4 being catalysts within the scope of catalyst system used in the methods disclosed and claimed in this specification.

To illustrate the manufacture of a catalyst system, detailed instructions will be given for the manufacture of a catalyst system, namely, one containing palladium on an upstream portion of the catalyst support and palladium/tungsten on a downstream portion of the catalyst support. The other catalyst systems disclosed herein may be manufactured using the same general procedures simply by selection of the appropriate elements as needed.

The preparation of a preferred catalyst system to be used with the method of this invention is as follows. The preferred catalyst system has the data generated thereon as set forth in FIG. 2. The preferred catalyst system will be one which has a catalyst support medium having an upstream support portion over which exhaust gases initially flow and a downstream support portion over which exhaust gases flow after passing over the upstream support portion thereof. The upstream support portion will have palladium thereon, while the downstream support portion will have palladium and tungsten thereon as the principal catalyst elements. The preparation of this preferred catalyst system is initiated by coating a cordierite honeycomb substrate (400 square cells per inch, 6 mil wall thickness) as available from Corning Glass Company, using gamma alumina washcoat. After coating with the gamma alumina, the substrate is calcined at 600° C. for a period of 3 to 4 hours. This substrate has approximately 9% by weight of the substrate of gamma alumina contained thereon.

The tungsten is next impregnated on the downstream support portion of the support media over the gamma alumina which has been previously placed thereon. The tungsten is placed on the substrate by using a solution of $H_2WO_4$ in concentrated $NH_4OH$. This solution is dried on the coated substrate at a temperature of 130° C. and then calcined at 300° C. for a time period of 3 to 4 hours. The tungsten is placed by this process onto the downstream support portion of the substrate in a finely divided manner and is present as approximately 4.75% by weight of the weight of the substrate.

The palladium is now impregnated onto both the upstream support portion and the downstream support portion of the support medium using an acidic aqueous solution of palladium chloride (4%/vol. in concentrated $HNO_3$). This solution is dried on the substrate at 130° C. and then calcined at 500° C. for a time period of 3 to 4 hours. This results in approximately 0.2% by weight of the substrate of palladium being applied to the substrate over its upstream support portion and its downstream support portion. In the downstream support portion, of course, there is an excess of tungsten available on the substrate and the tungsten is present in sufficient quantity such that the tungsten is available to substantially all of the palladium on the downstream support portion of the support medium.

Although this preferred embodiment was prepared as outlined above, there are a number of ways that a skilled artisan can vary the preparation. For example, instead of impregnating tungsten and gamma alumina in two consecutive steps on the downstream support portion of the support medium, this process can be combined into one step. Also, the gamma alumina need not be coated on a honeycomb, but may be coated onto different support configurations such as a metallic substrate as required for different applications. Also, the palladium/tungsten combination may be placed on the support medium as a presynthesized compound in a single step. Pelleted or extruded alumina can be used as a support medium in place of a monolithic support. In this case, one does not need a high surface area alumina washcoating step.

Reference is now made to FIGS. 1, 2, 3 and 4 so that the benefits of the catalyst system of this invention may be better understood.

In FIG. 1 there is shown the effect of redox ration on the conversion efficiency for oxides of nitrogen, carbon monoxide and unburned hydrocarbons over a catalyst system coated uniformly with 0.15% by weight of the substrate palladium, 4.75% by weight of the substrate tungsten, and 9% by weight of gamma alumina. This particular catalyst system is the subject matter of our application previously mentioned on page 1 of this specification. This graphical presentation is of interest because it shows that the efficiency of this catalyst remains high for the conversion of hydrocarbons even though one moves into a fuel rich region past a redox ratio of 1.0. It also shows that the oxides of nitrogen conversion ratio is good in the rich region and actually increases as one goes to richer stoichiometric mixtures.

It does, however, show that the oxides of nitrogen conversion rate is not so good for redox ratios below approximately 1.4.

In the catalyst system used in the methods of this specification, the catalyst substrate is divided into an upstream support portion and a downstream support portion. Both the upstream support portion and the downstream support portion contain, in a preferred test embodiment from which data was developed for presentation in FIG. 2, 9% by weight of the substrate gamma alumina. The upstream support portion and the downstream support portion of the substrate were generally two portions of the substrate placed back to back. The downstream support portion of the substrate contained 4.75% by weight of that portion of the substrate of tungsten, while both the upstream and the downstream portions of the substrate contained 0.15% by weight of the substrate of palladium. Thus, the upstream portion of the substrate had palladium thereon, while the downsteam portion of the substrate had a palladium/tungsten combination thereon. The significant thing to note about this new combination was that the gross $NO_x$ conversion efficiency was greatly increased at redox ratios as low as 0.9. The amount of ammonia formed, as compared to oxides of nitrogen converted, also remained extremely low over most redox ratios. This catalyst system also has a very excellent ability in converting unburned hydrocabons across a significant range of redox ratios.

Figure 2:
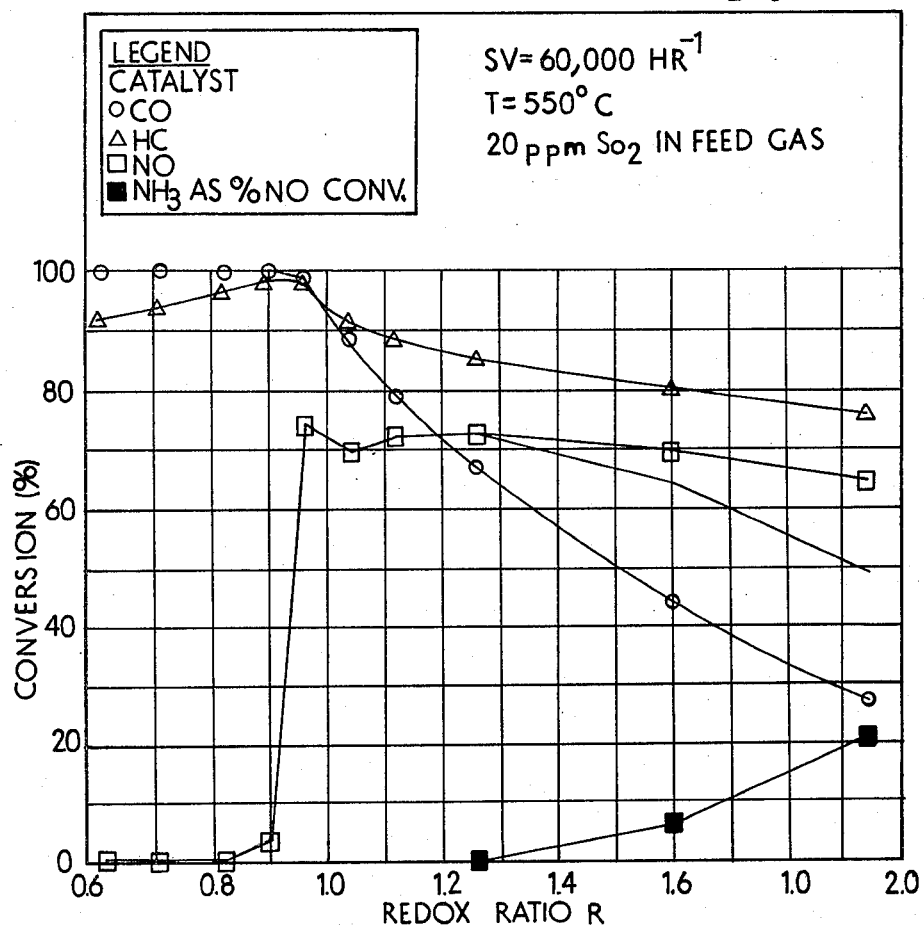
FIG. 2 is a graphical presentation of data on the effect of redox ratio on the conversion efficiency of oxides of nitrogen, carbon monoxide and hydrocarbons over a catalyst system containing a substrate having 9% by weight gamma alumina over its entire extent and over a first half or upstream support portion thereof, 0.15% by weight palladium and over a downstream half thereof 0.15% by weight palladium/4.75% by weight tungsten.

FIG. 2 graphically illustrates that the catalyst made to be used in accordance with the teachings of a preferred embodiment of the method of this invention would serve as an excellent three-way catalyst. Such a catlyst normally operates at a redox ratio of about 1.0 plus or minus 0.05 units. In this range, the efficiencies for the catalyst system in conversion of oxides of nitrogen, unburned hydrocarbons and carbon monoxide is very good. In fact, one may say the conversion efficiency, if used as a three-way catalyst, is excellent because it is based upon relatively inexpensive catalyst materials rather than the more costly platinum or rhodium which have been used in the past.

Figure 3:
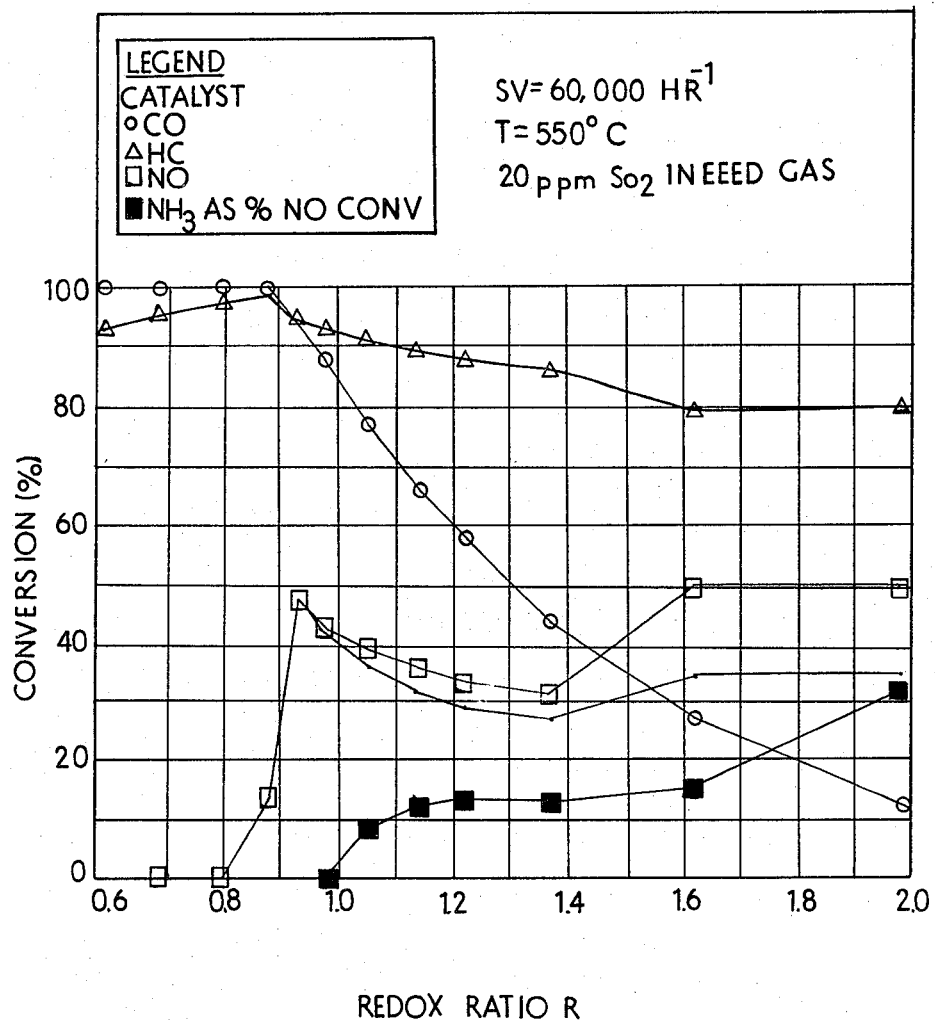
FIG. 3 is a graphical presentation of data on the effect of redox ratio on conversion efficiency of oxides of nitrogen, carbon monoxide and hydrocarbons over the catalyst system of FIG. 2 with the catalyst system reversed so that the palladium/tungsten portion thereof now defines the upstream portion of the support medium and the palladium based catalyst defines the downstream support portion.

The graphical information depicted in FIG. 3 was obtained by turning the catalyst system used to obtain the information in FIG. 2 in the opposite direction. In the opposite direction, the upstream support portion of the catalyst substrate had the palladium/tungsten combination thereon, while the downstream support portion had the palladium thereon. The data to be noted here is that while the catalyst system did maintain its good conversion efficiency for unburned hydrocarbons and carbon monoxide over a significant range of redox ratios, its conversion efficiency with respect to total oxides of nitrogen was much depressed over that shown in FIG. 2. Therefore, the placement of the palladium on the upstream portion, followed by the palladium/tungsten combination, is demonstrated as th only feasible way of obtaining the very effective total oxides of nitrogen conversion around a redox ratio of 1.0.

Figure 4:
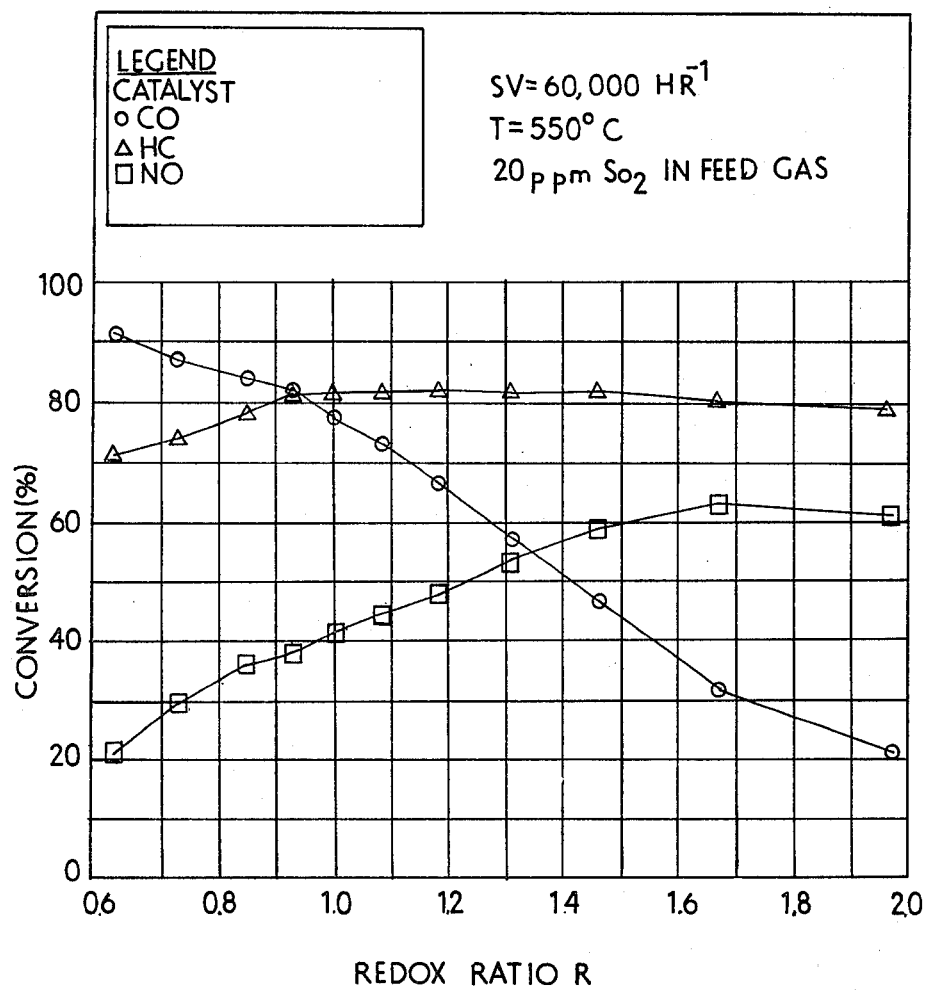
FIG. 4 is a graphical presentation of data on the effect of redox ratio on conversion efficiency of oxides of nitrogen, carbon monoxide and hydrocarbons over a catalyst system similar to that graphically depicted in FIG. 2 with the addition to the upstream palladium of 2.0% by weight molybdenum.

FIG. 4 is a graphical presentation of data obtained on a catalyst system similar to that tested in FIG. 2. The sole exception in this situation was that the upstream portion of the catalyst system not only had palladium thereon, but also 2% by weight of the upstream portion of the substrate of molybdenum. The purpose of the molybdenum is to increase the selectivity of the palladium in its ability to convert oxides of nitrogen under fuel deficient (oxygen rich) operating conditions that exist at redox ratios below 1.0. It should be noted that the efficiency below 1.0 is promoted if molybdenum is added, but the efficiency above 1.0 is curtailed for at least some or all of the redox ratios above the 1.0 position. One may therefore want to use molybdenum along with palladium on a catalyst system which is to operated on the oxygen rich side of stoichiometric conditions such as, for example, the conditions which are found in engines operating under the fast burn/low friction cycle.

It is understood that many different materials may find their way onto a catalyst substrate for a particular use. For example, certain materials are put on the catalyst substrate in order to stabilize the gamma alumina catalyst washcoat. Also, other washcoat material such as zirconia or alpha alumina may be used and these also may have their stabilizing elements. As an additional matter, stabilizing elements may be present for stabilizing the catalyst materials under certain operating conditions, for example, under oxidizing or reducing conditions. In a similar manner, materials also find their way onto the catalyst substrate in order to promote catalyst activity or to ensure the action of the stabilizer material. The appended claims are not to be construed so as to eliminate such materials from the catalyst system of our invention. Our predominant invention is that the use of a combination of palladium and palladium/tungsten in a catalyst system in upstrea/downstream relationship with respect to the flow of exhaust gases therethrough has certain unique benefits. It is well within the scope of the skilled artisan to use the unique benefits of this catalyst system with other catalyst materials, promoters and stabilizers therefor. Thus, the appended claims are to be interpreted as not excluding from their coverage the use of catalyst systems which use palladium and tungsten in the manner described in this specification, but use such materials in combination with other catalyst elements as well as promoters and stabilizers therefor.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. In a process for treatment of exhaust gases from an internal combustion engine, the steps of:
   burning a hydrocarbon fuel or a fuel containing hydrocarbons and alcohol blends in the internal combustion engine thereby to generate exhaust gases from the internal combustion engine containing various amounts of unburned hydrocarbons, carbon monoxide and oxides of nitrogen depending upon operating conditions of the internal combustion engine; and
   passing said generated exhaust gases over an improved catalyst comprising:
   a support medium for supporting a catalyst system, said support medium having both an upstream support portion over which exhaust gases initially flow and a downstream support portion over which exhaust gases flow after passing over said upstream support portion thereof;
   palladium on said upstream support portion;
   palladium on said downstream support portion; and
   finely divided tungsten on said downstream support portion, said tungsten being present on said downstream support portion in quantities that tungsten is available to substantially of said palladium on said downstream support portion so that said palladium/tungsten combination is effective in the catalytic oxidation of unburned hydrocarbons and carbon monoxide and the catalytic reduction of oxides of nitrogen without significant production of ammonia when the internal combustion engine is operating under fuel rich conditions.

2. In a process for treatment of exhaust gases from an internal combustion engine, the steps of:
   burning a hydrocarbon fuel or a fuel containing hydrocarbons and alcohol blends in the internal combustion engine thereby to generate exhaust gases from the internal combustion engine containing various amounts of unburned hydrocarbons, carbon monoxide and oxides of nitrogen depending upon operating conditions of the internal combustion engine; and
   passing said generated exhaust gases over an improved catalyst comprising:
   a support medium for supporting a catalyst system, said support medium having both an upstream support portion over which exhaust gases initially flow and a downstream support portion over which exhaust gases flow after passing over said upstream support portion thereof;
   finely divided palladium on said upstream support portion;
   finely divided palladium on said downstream support portion; and
   finely divided tungsten on said downstream support portion, said tungsten being present on said downstream support portion in quantities that tungsten is available to substantially of said palladium on said downstream support portion so that said palladium/tungsten combination is effective in the catalytic oxidation of unburned hydrocarbons and carbon monoxide and the catalytic reduction of oxides of nitrogen without significant prodction of ammonia when the internal combustion engine is operating under fuel rich conditions.

3. The process of claim 1 or 2, in which the support media is a gamma alumina coated monolithic substrate.

4. The process of claim 1 or 2, in which the support media is gamma alumina pellets.

5. The process of claim 1 or 2, in which the support media is a washcoated metallic substrate.

6. The process of claim 1 or claim 2, in which said upstream support portion also has molybdenum thereon.

7. In a process for treatment of exhaust gases from an internal combustion engine, the steps of:
   burning a hydrocarbon fuel or a fuel containing hydrocarbons and alcohol blends in the internal combustion engine thereby to generate exhaust gases from the internal combustion engine containing various amounts of unburned hydrocarbons, carbon monoxide and oxides of nitrogen depending upon operating conditions of the internal combustion engine; and
   passing said generated exhaust gases over an improved catalyst comprising:
   a support medium for supporting a catalyst system, said support medium having both an upstream support portion over which exhaust gases initially flow and a downstream support portion over which exhaust gases flow after passing over said upstream support portion thereof;

0.02 to 1.0% by weight of the substrate of finely divided palladium on both said upstream portion and said downstream portion of said suport medium; and on said downstream support portion of said substrate from 2 to 50 times the weight of palladium present on said downstream support portion of said substrate of finely divided tungsten, said tungsten being present on the said downstream portion of said catalyst support medium in a quantity such that tungsten is available to substantially all of said finely divided palladium on the catalyst support medium so that said palladium/tungsten combination is particularly effective in the catalytic oxidation of unburned hydrocarbons and carbon monoxide and the catalytic reduction of oxides of nitrogen without significant production of ammonia when the internal combustion engine is operating under fuel rich conditions.

8. The process of claim 7, in which the support media is a gamma alumina coated monolithic substrate.

9. The process of claim 7, in which the support media is gamma alumina pellets.

10. The process of claim 7, in which the support media is a washcoated metallic substrate.

11. The process of claim 7, in which said finely divided tungsten is present from 5 to 20 times the weight of palladium present.

12. The process of claim 7, in which said upstream support portion also has has molybdenum thereon.

13. In a process for treatment of exhaust gases from an internal combustion engine, the steps of:

burning a hydrocarbon fuel or a fuel containing hydrocarbons and alcohol blends in the internal combustion engine thereby to generate exhaust gases from the internal combustion engine containing various amounts of unburned hydrocarbons, carbon monoxide and oxides of nitrogen depending upon operating conditions of the internal combustion engine; and passing said generated exhaust gases over an improved catalyst comprising:

a support medium for supporting a catalyst system, said support medium having both an upstream support portion over which exhaust gases initially flow and a downstream support portion over which exhaust gases flow after passing over said upstream support portion thereof;

palladium on said upstream support portion;

on said downstream support portion a presynthesized $PdWO_x$ (x goes from 1 to 3), said presynthesized palladium/tungsten compound being effective in the catalytic oxidation of unburned hydrocarbons and carbon monoxide and the catalytic reduction of oxides of nitrogen without significant production of ammonia when the internal combustion engine is operating under fuel rich conditions.

14. The process of claim 13, in which the support media is a gamma alunina coated monolithic substrate.

15. The process of claim 13, in which the support media is gamma alumina pellets.

16. The process of claim 13, in which the support media is a washcoated metallic substrate.

17. The process of claim 13, in which said upstream portion also has molybdenum thereon.

* * * * *